United States Patent
Cho et al.

(10) Patent No.: US 11,329,318 B2
(45) Date of Patent: May 10, 2022

(54) ELECTROLYTE ADDITIVE FOR LITHIUM SECONDARY BATTERY AND LITHIUM SECONDARY BATTERY INCLUDING THE SAME

(71) Applicant: Samsung SDI Co., Ltd., Yongin-si (KR)

(72) Inventors: Wonseok Cho, Yongin-si (KR); Pavel Shatunov, Yongin-si (KR); Olga Tsay, Yongin-si (KR); Younghye Kang, Yongin-si (KR); Aeran Kim, Yongin-si (KR); Hyejin Park, Yongin-si (KR); Myungheui Woo, Yongin-si (KR); Duckjae You, Yongin-si (KR); Taejin Lee, Yongin-si (KR); Harim Lee, Yongin-si (KR); Jinhyeok Lim, Yongin-si (KR); Hyunbong Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 357 days.

(21) Appl. No.: 16/682,804

(22) Filed: Nov. 13, 2019

(65) Prior Publication Data
US 2020/0220217 A1    Jul. 9, 2020

(30) Foreign Application Priority Data

Jan. 3, 2019 (KR) .................. 10-2019-0000857

(51) Int. Cl.
*H01M 10/0567* (2010.01)
*H01M 10/0525* (2010.01)
(Continued)

(52) U.S. Cl.
CPC .......... *H01M 10/0567* (2013.01); *C07F 7/10* (2013.01); *H01M 4/525* (2013.01);
(Continued)

(58) Field of Classification Search
CPC ......... H01M 10/0525; H01M 10/0567; H01M 10/0568; H01M 10/0569; H01M 2004/028; H01M 2300/0025; H01M 4/525
See application file for complete search history.

(56) References Cited

U.S. PATENT DOCUMENTS

| 8,404,389 B2 | 3/2013 | Ihara et al. |
| 10,050,304 B2 | 8/2018 | Onozuka et al. |

(Continued)

FOREIGN PATENT DOCUMENTS

| JP | 2014-127354 A | 7/2014 |
| KR | 10-0789718 B1 | 1/2008 |

(Continued)

*Primary Examiner* — Carlos Barcena
(74) *Attorney, Agent, or Firm* — Lewis Roca Rothgerber Christie LLP

(57) ABSTRACT

Disclosed herein is an additive for a lithium secondary battery, the additive including a compound represented by Formula 1. An electrolyte for a lithium secondary battery includes: a lithium salt; a non-aqueous organic solvent; and the additive represented by Formula 1. A lithium secondary battery includes: a cathode; an anode; and the electrolyte including the additive represented by Formula 1.

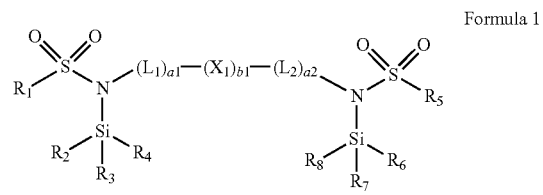

Formula 1

16 Claims, 4 Drawing Sheets

(51) Int. Cl.
　　　*H01M 4/525*　　(2010.01)
　　　*C07F 7/10*　　(2006.01)
　　　*H01M 4/02*　　(2006.01)

(52) U.S. Cl.
　　　CPC .. *H01M 10/0525* (2013.01); *H01M 2004/028* (2013.01); *H01M 2300/0025* (2013.01)

(56) References Cited

U.S. PATENT DOCUMENTS

2016/0248121 A1　8/2016　Uematsu et al.
2019/0288337 A1　9/2019　Choi et al.

FOREIGN PATENT DOCUMENTS

| KR | 10-2008-0052421 A | 6/2008 |
| KR | 10-2013-0033363 A | 4/2013 |
| KR | 10-2016-0040708 A | 4/2016 |
| KR | 10-2019-0109099 A | 9/2019 |

ELECTROLYTE ADDITIVE FOR LITHIUM SECONDARY BATTERY AND LITHIUM SECONDARY BATTERY INCLUDING THE SAME

CROSS-REFERENCE TO RELATED APPLICATION

This application claims priority to and the benefit of Korean Patent Application No. 10-2019-0000857, filed on Jan. 3, 2019, in the Korean Intellectual Property Office, the entire content of which is incorporated herein by reference.

BACKGROUND

1. Field

Embodiments of the present disclosure relate to an electrolyte additive for a lithium secondary battery and a lithium secondary battery including the same.

2. Description of Related Art

Lithium secondary batteries are used as power sources for driving portable electronic appliances such as video cameras, mobile phones, and notebook computers. Rechargeable lithium secondary batteries may have three times higher energy density per unit weight than existing lead batteries, nickel-cadmium batteries, nickel metal hydride batteries, and nickel-zinc batteries, and may be charged at high speed.

Because lithium secondary batteries are operated at a high driving voltage, aqueous electrolytes having high reactivity with lithium should not be used. An organic electrolytic is generally used as the electrolyte in lithium secondary batteries. The organic electrolyte is prepared by dissolving a lithium salt in an organic solvent. The organic solvent is stable at a high voltage, and has high ionic conductivity, a high dielectric constant, and low viscosity.

However, $LiPF_6$, which may be used as a lithium salt of an electrolyte, has a problem in that it reacts with an electrolyte solvent to promote the depletion of a solvent and generate a large amount of gas. When $LiPF_6$ decomposes, LiF and $PF_5^-$ are produced, which causes the depletion of an electrolyte in a battery, resulting in the deterioration of high-temperature performance and poor safety.

Accordingly, there is a need for an electrolyte for lithium secondary batteries which is capable of providing a lithium secondary battery in which the side reaction of the aforementioned electrolyte is suppressed or reduced and having improved lifetime characteristics and high-temperature stability.

SUMMARY

According to an aspect of an embodiment, there is provided a new additive for a lithium secondary battery.

According to another aspect of an embodiment, there is provided an electrolyte for a lithium secondary battery, the electrolyte including the additive.

According to another aspect of an embodiment, there is provided a lithium secondary battery including the electrolyte.

Additional aspects of embodiments will be set forth in part in the description which follows and, in part, will be apparent from the description, or may be learned by practice of the presented embodiments of the disclosure.

According to an aspect of an embodiment of the present disclosure, there is provided an additive for an electrolyte of a lithium secondary battery, including a compound represented by Formula 1 below:

Formula 1

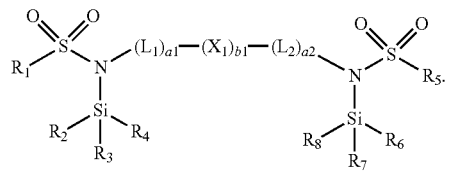

In Formula 1 above, $X_1$ is $N(R_9)$, O, or S, b1 is selected from an integer of 0 to 3, $L_1$ and $L_2$ are directly connected to each other when b1 is 0, and the $X_1$'s (e.g., $X_1$'s in the number of b1) are the same as or different from each other when b1 is 2 or more, $L_1$ and $L_2$ are each independently selected from a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, and a substituted or unsubstituted $C_2$-$C_{30}$ alkoxyalkyl group, and a substituted or unsubstituted $C_1$-$C_{30}$ alkylamine group, a1 and a2 are each independently selected from an integer of 0 to 10, the $L_1$'s (e.g., $L_1$'s in the number of a1) are the same as or different from each other when a1 is 2 or more, the $L_2$'s (e.g., $L_2$'s in the number of a2) are the same as or different from each other when a2 is 2 or more, and a1+a2 is 1 or more, $R_1$ to $R_9$ are each independently selected from a substituted or unsubstituted $C_1$-$C_{30}$ alkyl group, a substituted or unsubstituted $C_2$-$C_{30}$ alkenyl group, and a substituted or unsubstituted vinyl group, and substituents of the substituted $C_1$-$C_{30}$ alkyl group, the substituted $C_2$-$C_{30}$ alkenyl group, the substituted $C_2$-$C_{30}$ alkynyl group, the substituted $C_2$-$C_{30}$ alkoxyalkyl group, the substituted $C_1$-$C_{30}$ alkylamine group, and the substituted vinyl group are at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a vinyl group, a halogen, a cyano group, a hydroxyl group, and a nitro group.

According to another aspect of an embodiment of the present disclosure, there is provided an electrolyte for a lithium secondary battery, including: a lithium salt;

non-aqueous organic solvent; and the additive represented by Formula 1.

According to another aspect of an embodiment of the present disclosure, there is provided a lithium secondary battery, including: a cathode;

an anode; and the electrolyte including the additive represented by Formula 1.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
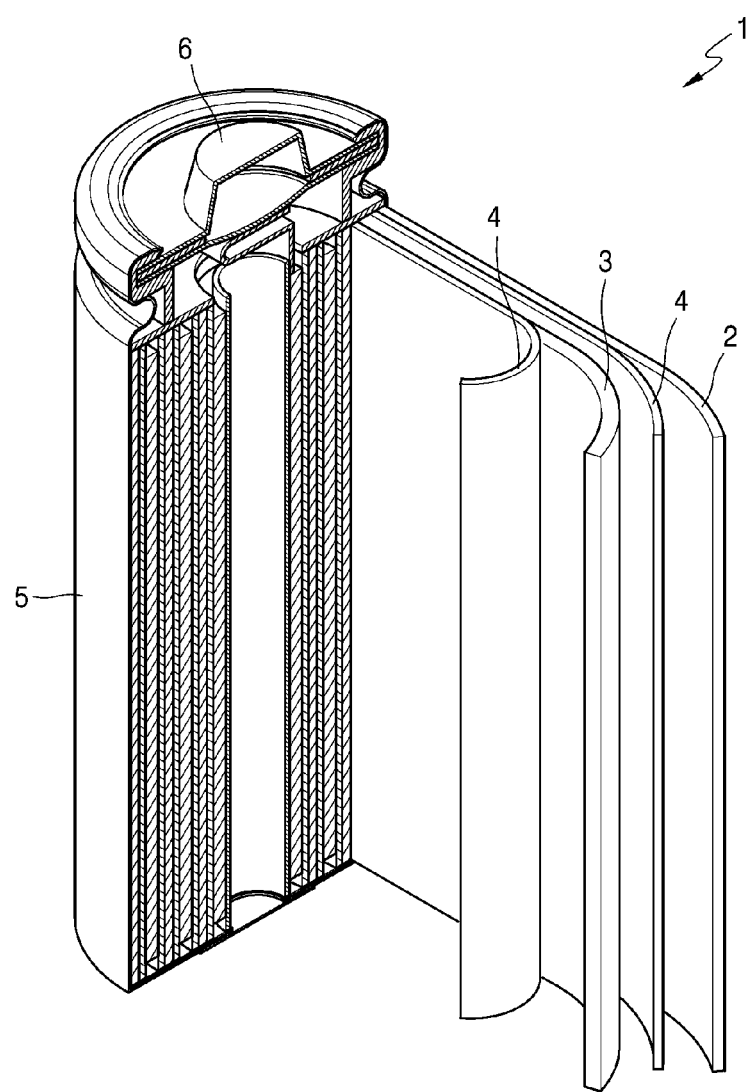
FIG. 1 is a schematic perspective view of a lithium secondary battery according to an embodiment.

Hereinafter, an additive for lithium secondary batteries, an organic electrolyte including the additive, and a lithium secondary battery employing the electrolyte according to embodiments will be described in more detail.

As used herein, "a" and "b" in "$C_a$-$C_b$" refer to the number of carbon atoms in a functional group. For example, the functional group may include "a" to "b" carbon atoms. Therefore, for example, the term "$C_1$-$C_4$ alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

Certain radical nomenclature may include mono-radicals or di-radicals depending on the context. For example, when one substituent requires two connection points in the remaining molecule, it is to be understood that the substituent is a di-radical. For example, a substituent recognized as an alkyl group requiring two connecting points include di-radicals such as —$CH_2$—, —$CH_2CH_2$—, or —$CH_2CH(CH_3)CH_2$—. Another radical nomenclature clearly indicates that the radical is a di-radical such as "alkylene" or "alkenylene."

As used herein, the term "alkyl group" refers to a branched or unbranched aliphatic hydrocarbon group. In an embodiment, an alkyl group may be substituted or unsubstituted. Examples of the alkyl group may include, but are not limited to, a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group. In another embodiment, these alkyl groups may be selectively substituted. In another embodiment, the alkyl group may include 1 to 6 carbon atoms. Examples of the alkyl group having 1 to 6 carbon atoms may include, but are not limited to, a methyl group, an ethyl group, a propyl group, an iso-propyl group, a butyl group, an iso-butyl group, a sec-butyl group, a pentyl group, a 3-pentyl group, and a hexyl group.

As used herein, the term "alkenyl group" refers to a hydrocarbon group having 2 to 20 carbon atoms including at least one carbon-carbon double bond, and examples thereof include, but are not limited to, an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cyclopentenyl group. In another embodiment, an alkenyl group may be substituted or unsubstituted. In another embodiment, the number of carbon atoms in the alkenyl group may be 2 to 40.

As used herein, the term "alkynyl group" refers to a hydrocarbon group having 2 to 20 carbon atoms including at least one carbon-carbon triple bond, and examples thereof include, but are not limited to, an ethynyl group, a 1-propynyl group, a 2-propynyl group, a 1-butynyl group, and a 2-butynyl group. In another embodiment, the alkynyl group may be substituted or unsubstituted.

As used herein, the term "alkoxyalkyl group" refers to a structure in which two branched or unbranched aliphatic hydrocarbon groups are connected by an oxygen atom (O). Examples of the alkoxyalkyl group may include, but are not limited to, a methoxymethyl group, a methoxyethyl group, a methoxypropyl group, a methoxyisopropyl group, a methoxybutyl group, a methoxytert-butyl group, a methoxypentyl group, a methoxyhexyl group, a methoxycyclopentyl group, a methoxycyclohexyl group, a methoxycycloheptyl group, an ethoxymethyl group, an ethoxyethyl group, an ethoxypropyl group, an ethoxyisopropyl group, an ethoxytert-butyl group, an ethoxypentyl group, an ethoxyhexyl group, an ethoxycyclopropyl group, an ethoxycyclopentyl group, an ethoxycyclohexyl group, and an ethoxycycloheptyl group. In another embodiment, each of them may be selectively substituted.

As used herein, the term "alkylamine group" refers to a structure in which a branched or unbranched aliphatic hydrocarbon group is connected to an amine group by a carbon-nitrogen bond (e.g., C—N bonding).

As used herein, the term "vinyl group" refers to a structure represented by "$CH_2$=CH—*" (where, * is a bonding site with neighboring atoms).

As described herein, a substituent may be derived from an unsubstituted parent group. Here, at least one hydrogen atom may be substituted with another atom or functional group. Unless otherwise expressed, when a function group is considered "substituted," it means that the functional group is substituted with at least one substituent selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, halogen, a cyano group, a hydroxy group, and a nitro group. When it is described that one functional group is "selectively substituted," the functional group may be substituted with the aforementioned substituent.

An additive for an electrolyte of a lithium secondary battery according to an embodiment includes a compound represented by Formula 1 below:

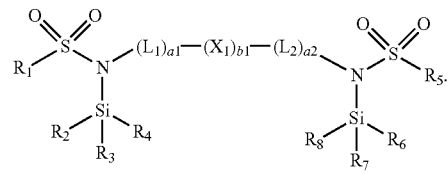

Formula 1

When the additive including the compound of Formula 1 is added to an electrolyte for a lithium secondary battery, the lifetime characteristics and high-temperature stability of the lithium secondary battery may be improved.

In Formula 1 above, $X_1$ is $N(R_9)$, O, or S.

In Formula 1 above, b1 may be selected from an integer of 0 to 3, $L_1$ and $L_2$ may be directly connected to each other when b1 is 0, and b1 $X_1$'s may be the same as or different from each other when b1 is 2 or more, For example, b1 may be 0, but the present disclosure is not limited thereto.

In Formula 1 above, $L_1$ and $L_2$ are each independently selected from a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, and a substituted or unsubstituted $C_2$-$C_{30}$ alkoxyalkyl group, and a substituted or unsubstituted $C_1$-$C_{30}$ alkylamine group.

According to an embodiment, in Formula 1 above, $L_1$ and $L_2$ may be each independently selected from a methylene group, an ethylene group, a propylene group, a butylene group, a pentylene group, a hexylene group, and a heptylene group; and a methylene group, an ethylene group, a propylene group, a butylene group, a pentylene group, a hexylene group, and a heptylene group, each of which is substituted with at least one selected from a methyl group, an ethyl group, a propyl group, a vinyl group, —F, —Cl, —Br, —I, a cyano group, a hydroxyl group, and a nitro group.

For example, in Formula 1 above, $L_1$ and $L_2$ may be each independently selected from a methylene group and an ethylene group; and a methylene group and an ethylene group substituted with at least one selected from a methyl group, an ethyl group, and a propyl group. However, the present disclosure is not limited thereto.

In the above Formula 1, a1 and a2 may be each independently selected from an integer of 0 to 10, a1 $L_1$'s may be the same as or different from each other when a1 is 2 or more, a2 $L_2$'s may be the same as or different from each other when a2 is 2 or more, and a1+a2 may be 1 or more, For example, in Formula 1 above, a1+a2 may be 1 or 2, but the present disclosure is not limited thereto.

According to an embodiment, in Formula above, b1 may be 0, each of a1 and a2 may be 1, and each of $L_1$ and $L_2$ may be a methylene group;

b1 may be 0, a1 may be 1, a2 may be 0, and $L_1$ may be an ethylene group;

b1 may be 0, a1 may be 2, a2 may be 0, and $L_1$ may be a methylene group;

b1 may be 0, a1 may be 0, a2 may be 1, and $L_2$ may be an ethylene group; or b1 may be 0, a1 may be 0, a2 may be 2, and $L_2$ may be a methylene group. However, the present disclosure is not limited thereto.

In Formula 1 above, $R_1$ to $R_9$ are each independently selected from a substituted or unsubstituted $C_1$-$C_{30}$ alkyl group, a substituted or unsubstituted $C_2$-$C_{30}$ alkenyl group, and a substituted or unsubstituted vinyl group, and each of substituents of the substituted $C_1$-$C_{30}$ alkyl group, the substituted $C_2$-$C_{30}$ alkenyl group, the substituted $C_2$-$C_{30}$ alkynyl group, the substituted $C_2$-$C_{30}$ alkoxyalkyl group, the substituted $C_1$-$C_{30}$ alkylamine group and the substituted vinyl group is at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a vinyl group, a halogen, a cyano group, a hydroxyl group, and a nitro group.

According to an embodiment, in Formula above, $R_1$ to $R_9$ may be each independently selected from a $C_1$-$C_{30}$ alkyl group, a vinyl group, an a $C_1$-$C_{30}$ alkyl group substituted with at least one selected from a methyl group, an ethyl group, a propyl group, a butyl group, —F, —Cl, —Br, —I, a cyano group, a hydroxy group, and a nitro group.

For example, in Formula 1 above, each of $R_1$ to $R_9$ may be a $C_1$-$C_{30}$ alkyl group, but the present disclosure is not limited thereto.

According to an embodiment, the compound of Formula 1 above may be Compound 1 below:

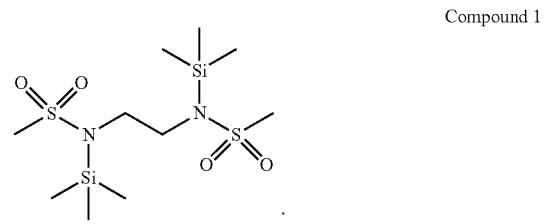

Compound 1

The reason why the compound is added to an electrolyte to improve the performance of a lithium secondary battery will be described in more detail herein below. However, this is to aid the understanding of the present disclosure, and the scope of the present disclosure is not limited to the following description.

Because the compound represented by Formula 1 above includes a sulfonamide moiety and a silyl moiety having excellent electrical and chemical reactivity at the end thereof, the decomposition of an organic solvent such as ethylene carbonate (EC) may be suppressed or reduced to reduce the generation of gas, and thus, a resistance increase rate may be lowered.

Further, although $LiPF_6$ is not generally used as the lithium salt included in an electrolyte, $LiPF_6$ may have insufficient or undesirable thermal stability and may be easily hydrolyzed even by water. However, when the additive including the compound represented by Formula 1 is added to an electrolyte, $PF_5^-$ ions generated by the decomposition of water ($H_2O$) molecules and $LiPF_6$ may be captured by (e.g., reacted with) a sulfonamide moiety and a silyl moiety, which are functional groups of Formula 1, thereby suppressing or reducing the hydrolysis reaction of $LiPF_6$ by moisture. As a result, the generation of gas in the lithium secondary battery may be suppressed or reduced to improve cycle lifetime characteristics. Further, the swelling phenomenon of a battery due to the suppression of gas generation may be prevented or reduced.

In addition, a sulfonamide moiety and a silyl moiety located at the end of Formula 1 may form a stable thin film on the surface of a metal substrate through a complexing reaction with metal ions, for example, copper ions ($Cu^{2+}$) eluted from the metal substrate. Due to the formation of such a thin film, the additional elution of metal from the metal substrate may be suppressed or reduced, and thus, the overdischarging of a battery during the storage of the battery may be suppressed or reduced to improve battery characteristics.

During the initial charging of the lithium secondary battery, the decomposition reaction of an electrolyte may occur on the surface of an anode. The reason for this is that the reduction potential of the electrolyte is relatively higher than that of lithium. The decomposition reaction of an electrolyte may form a solid electrolyte interphase (SEI) on the surface of an electrode to suppress or reduce the movement of electrons required for a reaction between an anode and an electrolyte, thereby preventing or reducing the additional decomposition of the electrolyte. Thus, the performance of a battery depends on the characteristics of a film formed on the surface of an anode. Considering this, it is beneficial to form an SEI layer that is more rigid and has excellent electrical characteristics through the introduction of an electrolyte additive that is decomposed before the electrolyte during a charging reaction.

The additive for an electrolyte of a lithium secondary battery, represented by Formula 1, according to an embodiment may include sulfonamide moieties having excellent electrochemical reactivity at both ends thereof during a charging reaction, and thus, the additive may be decomposed before the electrolyte, thereby forming an SEI film that is rigid and has excellent electrical characteristics on the surface of an anode.

Further, the additive for an electrolyte of a lithium secondary battery, represented by Formula 1, according to an embodiment may include silyl moieties at both ends thereof, and thus, an SEI film having a high silyl group concentration may be formed, thereby forming a chemically stable film having high polarity. Accordingly, the resistance at the interface between an electrolyte and an anode may be lowered to improve the conductivity of lithium ions, and thus, there is an effect of increasing a low-temperature discharge voltage.

Further, because the sulfonamide moiety has excellent electrochemical reactivity, a transition metal oxide and a donor-acceptor bond, exposed to the surface of a cathode active material, may be formed, and thus, a protective layer may be formed in the form of a composite.

Further, because the sulfonamide moiety attached to a transition metal oxide may be oxidized during the initial charging of the lithium secondary battery, consequently, an inactive layer that is more stable and excellent in ion conductivity may be formed on a cathode. Accordingly, it is possible to prevent or reduce oxidative decomposition of other components of the electrolyte, and consequently, it is possible to improve the cycle lifetime performance of the lithium secondary battery and prevent or reduce the occurrence of a swelling phenomenon.

An electrolyte for a lithium secondary battery according to an embodiment may include: a lithium salt; a non-aqueous organic solvent; and the additive represented by Formula 1.

For example, an amount (e.g., a weight or the content) of the additive may be in a range of about 0.1 wt % to about 3 wt % based on the total weight of the electrolyte, but the present disclosure is not limited thereto. The amount (e.g., weight or content) thereof may be suitably or appropriately selected within the range that does not (or substantially does not) deteriorate the characteristics of a battery. For example, the amount (e.g., weight or content) of the additive may be in a range of about 0.1 wt % to about 2.5 wt % based on the total weight of the electrolyte. For example, the amount (e.g., weight or content) of the additive may be in a range of about 0.1 wt % to about 2.3 wt % based on the total weight of the electrolyte. For example, the amount (e.g., weight or content) of the additive may be in a range of about 0.1 wt % to about 2 wt % based on the total weight of the electrolyte.

When the amount (e.g., weight or content) of the additive exceeds the above amount range, for example, exceeds 3 wt % based on the total weight of the electrolyte, the additive acts as a resistor, so that, due to an increase of interfacial resistance, battery life may deteriorate, and resistance may increase. In contrast, the amount (e.g., weight or content) of the additive is less than 0.1 wt %, high-temperature storage characteristics may deteriorate.

In an embodiment, the electrolyte for a lithium secondary battery may further include an aliphatic nitrile compound. For example, the aliphatic nitrile compound may include, but is not limited to, acetonitrile (AN) or succinonitrile (SN). Any suitable aliphatic nitrile compound generally used in the art may be used.

For example, the amount (e.g., weight or content) of the aliphatic nitrile compound may be in a range of about 0.1 wt % to about 10 wt % based on the total weight of the electrolyte, but the present disclosure is not limited thereto. The amount (e.g., weight or content) thereof may be suitably or appropriately selected within the range that does not inhibit (or substantially does not inhibit) the effect of suppressing or reducing the elution of metal.

In an embodiment, the lithium salt may include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ ($0 \leq x \leq 20$, $0 \leq y \leq 20$), LiCl, LiI, lithium bis(oxalate) borate (LiBOB), and $LiPO_2F_2$, but the present disclosure is not limited thereto. For example, the lithium salt may include lithium bis(fluorosulfonyl) imide ($LiN(FSO_2)_2$). Any suitable lithium salt generally used in the art may be used.

The concentration of the lithium salt in the electrolyte may be in a range of about 0.01 M to about 2.0 M, but the present disclosure is not limited to this range. An appropriate or suitable concentration may be used as needed or desired. Within the above concentration range, further improved battery characteristics may be obtained.

In an embodiment, the non-aqueous organic solvent may include at least one selected from ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethyl formamide, dimethylacetamide, gamma-valerolactone, gamma-butyrolactone, and tetrahydrofuran, but the present disclosure is not limited thereto. Any suitable organic solvent generally used in the art may be used.

The electrolyte may be in a liquid or gel state. The electrolyte may be prepared by adding the lithium salt and the additive to the organic solvent.

A lithium secondary battery according to another embodiment includes a cathode; an anode; and the electrolyte. The form of the lithium secondary battery is not particularly limited, and may include a lithium secondary battery such as a lithium ion battery, a lithium ion polymer battery, and a lithium sulfur battery, as well as a lithium primary battery.

The operating voltage of the lithium secondary battery may be 4.2 V or more, for example, 4.3 V or more, for example, 4.45 V or more.

For example, the lithium secondary battery may be manufactured by the following method, but the present disclosure is not limited thereto.

First, a cathode is prepared.

For example, a cathode active material composition in which a cathode active material, a conductive material, a binder, and a solvent are mixed is prepared. A cathode plate is prepared by coating a cathode current collector with the cathode active material composition. In some embodiments, the cathode plate may be prepared by casting the cathode active material composition onto a separate support, separating a film from the support and then laminating the separated film on a metal current collector. The cathode is not limited to the above-described form, but may have a form other than the above-described form.

The cathode active material, which is a lithium-containing metal oxide, may be used without limitation and may be any suitable cathode active material that is generally used in the art. As the lithium-containing metal oxide, for example, two or more kinds of composite oxides of lithium and a metal selected from cobalt, manganese, nickel, and combinations thereof may be used. For example, as lithium-containing metal oxide, a compound represented by any one of Formulae of $Li_aA_{1-b}B^1{}_bD^1{}_2$ (where, $0.90 \leq a \leq 1.8$ and $0 \leq b \leq 0.5$ are satisfied); $Li_aE_{1-b}B^1{}_bO_{2-c}D^1{}_c$ (where, $0.90 \leq a \leq 1.8$, $0 \leq b \leq 0.5$, and $0 \leq c \leq 0.05$ are satisfied); $LiE_{2-b}B^1{}_bO_{4-c}D^1{}_c$ (where, $0 \leq b \leq 0.5$ and $0 \leq c \leq 0.05$ are satisfied); $Li_aNi_{1-b-c}Co_bB^1{}_cD^1{}_\alpha$, (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1{}_cO_{2-\alpha}F^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cD^1$, (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$ are satisfied); $Li_aNi_bCo_cMn_dG_eO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1.8$ and $0.001 \leq b \leq 0.1$ are satisfied); $Li_aCoG_bO_2$ (where, $0.90 \leq a \leq 1.8$ and $0.001 \leq b \leq 0.1$ are satisfied); $Li_aMnG_bO_2$ (where, $0.90 \leq a \leq 1.8$ and $0.001 \leq b \leq 0.1$ are satisfied); $Li_aMn_2G_bO_4$ (where, $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ may be used.

In the formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMn_gO_{2g}$ (g=1, 2), $LiNi_{1-g}Mn_gO_{2g}$ ($0<g<1$), $LiNi_{1-g-k}Co_gMn_kO_2$ ($0 \leq g \leq 0.5$, $0 \leq k \leq 0.5$), or $LiFePO_4$.

In some embodiments, the cathode may include a cathode active material having a layered structure.

For example, the cathode active material may be represented by Formula 3 below:

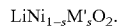

$LiNi_{1-s}M'_sO_2$.  Formula 3

In Formula 3, M' is at least one selected from Co, Mn, Al, Cu, Fe, Mg, Cr, Zn, B, and Ga, and $0 < s \leq 0.99$ is satisfied.

For example, the cathode active material may be represented by Formula 4 below:

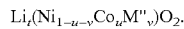

$Li_t(Ni_{1-u-v}Co_uM''_v)O_2$.  Formula 4

In Formula 4, M" is Mn or Al, $0.96 \leq t \leq 1.05$, $0 < u \leq 0.5$, and $0 < v \leq 0.5$) are satisfied. For example, in Formula 4, $0.01 \leq u \leq 0.35$ may be satisfied. For example, in Formula 4, $0.01 \leq v \leq 0.35$ may be satisfied.

For example, the cathode active material may be $LiNi_{0.33}Co_{0.33}Mn_{0.33}O_2$, $LiNi_{0.33}Co_{0.33}Al_{0.33}O_2$, $LiNi_{0.6}Co_{0.2}Mn_{0.2}O_2$, $LiNi_{0.6}Co_{0.2}Al_{0.2}O_2$, $LiNi_{0.8}Co_{0.1}Mn_{0.1}O_2$, or $LiNi_{0.8}Co_{0.1}Al_{0.1}O_2$, but the present disclosure is not limited thereto.

In one or more embodiments, a compound having a coating layer on the surface of the compound may be used, or a mixture of the compound and a compound having a coating layer may be used. The coating layer may include a coating element compound of an oxide of the coating element, a hydroxide of the coating element, an oxyhydroxide of the coating element, an oxycarbonate of the coating element, or a hydroxycarbonate of the coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any suitable coating method may be used as long as this compound may be coated with such elements by a method that does not (or substantially does not) adversely affect the physical properties of the cathode active material (for example, spray coating, dipping or the like). This coating method will be readily apparent to those skilled in the art upon review of the present disclosure such that a detailed description thereof is not necessary here.

The conductive material may be carbon black or graphite particles, but the present disclosure is not limited thereto. Any suitable conductive material generally used in the art may be used.

Examples of the binder may include, but are not limited to, a vinylidene fluoride/hexafluoropropylene copolymer, polyvinylidene fluoride (PVDF), polyacrylonitrile, polymethylmethacrylate, polytetrafluoroethylene and mixtures thereof, and a styrene butadiene rubber-based polymer. Any suitable binder generally used in the art may be used.

As the solvent, N-methylpyrrolidone, acetone, water, or the like may be used, but the present disclosure is not limited thereto. Any suitable solvent generally used in the art may be used.

The amount (e.g., weight or content) of the cathode active material, the amount (e.g., weight or content) of the conductive material, the amount (e.g., weight or content) of the binder, and the amount (e.g., weight or content) of the solvent may be at any suitable levels generally used in the art for a lithium secondary battery. At least one of the conductive material, the binder, and the solvent may be omitted depending on the use and configuration of the lithium secondary battery.

Next, an anode is prepared.

For example, an anode active material composition in which an anode active material, a conductive material, a binder, and a solvent are mixed is prepared. An anode plate is prepared by directly coating an anode current collector with the anode active material composition and drying the anode active material composition. In some embodiments, the anode plate may be prepared by casting the anode active material composition onto a separate support, separating a film from the support and then laminating the separated film on a metal current collector.

The anode active material may be used without limitation. Any suitable anode active material generally used in the art may be used. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, a Si—Y alloy (Y is an alkaline metal, an alkaline earth metal, a group 13 element, a group 14 element, a transition metal, or a combination thereof, not Si), or a Sn—Y alloy (Y is an alkaline metal, an alkaline earth metal, a group 13 element, a group 14 element, a transition metal, or a combination thereof, not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the transition metal oxide may be lithium titanium oxide, vanadium oxide, lithium vanadium oxide, and/or the like.

For example, the non-transition metal oxide may be $SnO_2$, $SiO_x$ (0<x<2), and/or the like.

The carbon-based material may be crystalline carbon, amorphous carbon, or a mixture thereof. The crystalline carbon may be graphite such as natural graphite and/or artificial graphite of an amorphous, plate-like, flake-like, spherical and/or fibrous form. The amorphous carbon may be soft carbon (low-temperature fired carbon), hard carbon, mesophase pitch carbide, and/or fired coke.

The conductive material, binder and solvent in the anode active material composition may be the same as those in the cathode active material composition.

The amount (e.g., weight or content) of the anode active material, the amount (e.g., weight or content) of the conductive material, the amount (e.g., weight or content) of the binder, and the amount (e.g., weight or content) of the solvent may be at any suitable levels generally used in the art for a lithium secondary battery. At least one of the conductive material, the binder, and the solvent may be omitted depending on the use and configuration of the lithium secondary battery.

Next, a separator to be inserted between the anode and the cathode is prepared.

As the separator, any suitable separator generally used in the art for a lithium battery may be used. A separator having low resistance to the movement of ions in the electrolyte and superior in electrolyte wettability may be used. For example, the separator may include any one selected from glass fiber, polyester, Teflon, polyethylene, polypropylene, polytetrafluoroethylene (PTFE), and combinations thereof, and may be made in the form of nonwoven fabric or woven fabric. For example, a windable separator including polyethylene, polypropylene, and/or the like may be used in a lithium ion battery, and a separator having good electrolyte impregnation ability may be used in a lithium ion polymer battery. For example, the separator may be produced by the following method.

A polymer resin, a filler, and a solvent are mixed to prepare a separator composition. The separator composition is directly applied on an electrode and dried to form a separator. In some embodiments, the separator composition is cast on a support and dried, a separation film is separated from the support, and then the separation film is laminated on the electrode to form a separator.

The polymer resin used in the production of the separator is not limited, and any suitable material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, the above-described electrolyte for a lithium secondary battery is prepared.

As shown in FIG. 1, the lithium secondary battery 1 includes a cathode 3, an anode 2, and a separator 4. The anode 3, the cathode 2, and the separator 4 are wound or folded and accommodated in a battery case 5. Then, an electrolyte is injected into the battery case 5, and the battery case 5 is sealed with a cap assembly 6 to complete the manufacture of the lithium secondary battery 1. The battery case 5 may have a cylindrical shape, a rectangular shape, or a thin film shape. For example, the lithium secondary battery 1 may be a large-sized thin-film battery. The lithium secondary battery 1 may be a lithium ion battery.

The separator 4 may be located between the anode 3 and the cathode 2 to form a battery structure. The battery structure is laminated as a bi-cell structure and then impregnated with an electrolyte, and the resulting product is accommodated in a pouch and sealed to complete a lithium ion polymer battery.

Further, the plurality of battery structures are laminated to form a battery pack, and this battery pack may be used in all appliances utilizing high capacity and high power. For example, the battery pack may be used in notebooks, smart phones, electric vehicles, and/or the like.

Further, because the lithium secondary battery is excellent in lifetime characteristics and high rate characteristics, it may be used in electric vehicles (EV). For example, the lithium secondary battery may be used in hybrid vehicles such as plug-in hybrid electric vehicles. Further, the lithium secondary battery may be used in fields utilizing a large amount of electric power storage. For example, the lithium secondary battery may be used in electric bicycles, electric tools, and/or the like.

Hereinafter, the present disclosure will be described in more detail with reference to Examples and Comparative Examples. However, these Examples are for illustrating non-limiting embodiments the present disclosure, and the scope of the present disclosure is not limited thereto.

Preparation of Electrolyte

Synthesis Example

Tetrahydrofuran (104 mL) and methanesulfonyl chloride (51.5 mL, 666 mmol) were put into a round bottom flask, and were cooled to 0° C. to obtain a mixed solution. Ethylenediamine (22.2 mL, 333 mmol) was dropped into the mixed solution, and then this mixed solution was slowly heated to room temperature and then further stirred for 1 day to form a solid. The formed solid was filtered, and then stored under tetrahydrofuran vapor. Thus, 67.0 g (93%) of a white solid (N,N'-(ethane-1,2-diyl)dimethanesulfonamide) was obtained. 1H NMR (400 MHz, CDCl3): δ 3.05 (s, 6H), 2.92 (t, 4H); 13C NMR (100 MHz, CDCl3): δ 45.12, 41.05. The obtained white solid (N,N'-(ethane-1,2-diyl)dimethanesulfonamide, 67.3 g, 311 mmol) and bis(trimethylsilyl)amine (65.8 mL, 314 mmol) was put into a round bottom flask, and then a catalytic amount of ammonium sulfate was added. The resulting mixture was stirred for 1 day to form a solid, and then the solid was filtered to obtain a white solid. The obtained white solid was precipitated and purified using a mixed solvent of dichloromethane and acetonitrile at a ratio of 1:1 to obtain Compound 1 in a state of white powder. (76.1 g, 68%)

1H NMR (400 MHz, CDCl3): δ 3.25 (t, 4H), 2.88 (s, 6H), 0.37 (s, 18H); 13C NMR (100 MHz, CDCl3): δ 47.90, 41.11, 1.15.

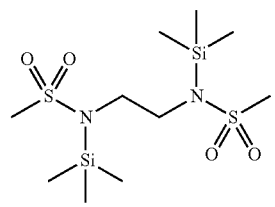

Compound 1

Preparation Example 1

1.5 M LiPF$_6$ was added to a first mixed solution in which ethylene carbonate (EC), ethyl methyl carbonate (EMC), and dimethyl carbonate (DMC) were mixed to a volume ratio of 2:2:6, to prepare a second mixed solution.

0.1 wt % of Compound 1 below was added to the second mixed solution to prepare an electrolyte for a lithium secondary battery.

Preparation Example 2

An electrolyte for a lithium secondary battery was prepared in substantially the same manner as in Preparation Example 1, except that 0.5 wt % of the Compound 1 was added.

Preparation Example 3

An electrolyte for a lithium secondary battery was prepared in substantially the same manner as in Preparation Example 1, except that 1 wt % of the Compound 1 was added.

Preparation Example 4

An electrolyte for a lithium secondary battery was prepared in substantially the same manner as in Preparation Example 1, except that 2 wt % of the Compound 1 was added.

Comparative Preparation Example 1

An electrolyte for a lithium secondary battery was prepared in substantially the same manner as in Preparation Example 1, except that the Compound 1 was not added.

Comparative Preparation Example 2

An electrolyte for a lithium secondary battery was prepared in substantially the same manner as in Preparation Example 1, except that 3 wt % of the Compound 1 was added.

Comparative Preparation Example 3

An electrolyte for a lithium secondary battery was prepared in substantially the same manner as in Preparation Example 1, except that 5 wt % of the Compound 1 was added.

Evaluation Example 1: Evaluation of CV Characteristics

Figure 2:
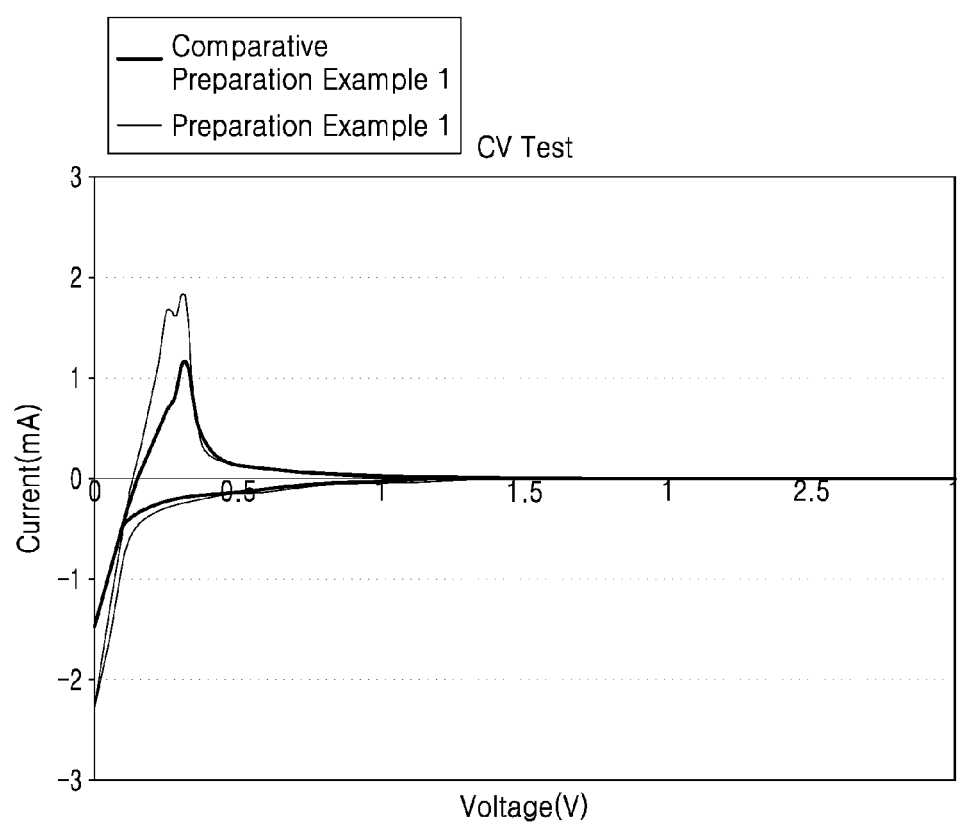
FIG. 2 is a graph illustrating the anode cyclic voltage currents of the electrolytes according to Preparation Example 1 and Comparative Preparation Example 1 measured using cyclic voltammetry (CV)

In order to evaluate the electrochemical stability of the electrolytes according to Preparation Example 1 and Comparative Preparation Example 1, measurement thereof was performed by cyclic voltammetry (CV), and the results thereof are shown in FIG. 2.

Anode CV measurement was performed by using a three electrode electrochemical cell in which a graphite anode is used as a working electrode and Li metal electrodes are used as a reference electrode and a counter electrode. In this case, scanning was performed from 3 V to 0 V and from 0 V to 3 V for 3 cycles, and the scanning speed was 0.1 mV/sec.

As shown in FIG. 2, in the cyclic voltage-current curve of the three electrode cells including the electrolyte according to Preparation Example 1, reduction peaks appeared in one cycle. In contrast, in the cyclic voltage-current curve of the three electrode cells including the electrolyte according to Comparative Preparation Example 1, reduction peaks did not appear. From these results, it is believed that, in the lithium secondary battery including the electrolyte prepared in Preparation Example 1, an initial SEI film is formed on the anode over a wide voltage range before solvent decomposition occurs during the charging process in which lithium ions are intercalated into the anode. Accordingly, it is believed that the lithium secondary battery employing the electrolyte according to Preparation Example 1 of the present disclosure has excellent battery performance as compared with the lithium secondary battery employing the electrolyte according to Comparative Preparation Example 1, in which the initial SEI film is not formed.

Manufacture of Lithium Secondary Battery

Example 1

98 wt % of artificial graphite (BSG-L, Tianjin BTR New Energy Technology Co., Ltd.), 1.0 wt % of styrene-butadiene rubber (SBR) binder (ZEON), and 1.0 wt % of carboxymethyl cellulose (CMC, manufactured by NIPPON A&L) were mixed, introduced into distilled water, and then stirred for 60 minutes using a mechanical stirrer to prepare an anode active material slurry. The slurry was applied onto a copper current collector having a thickness of 10 μm to a thickness of about 60 μm using a doctor blade, dried at 100° C. for 0.5 hours using a hot air dryer, further dried in vacuum at 120° C. for 4 hours, and then roll-pressed to prepare an anode plate.

Preparation of Cathode 97.45 wt % of LiNi$_{0.33}$Co$_{0.33}$Mn$_{0.33}$O$_2$, 0.5 wt % of artificial graphite (SFG6, Timcal) powder, 0.7 wt % of carbon black (Ketjen black, ECP), 0.25 wt % of modified acrylonitrile rubber (BM-720H, manufactured by Zeon Corporation), 0.9 wt % of polyvinylidene fluoride (PVdF, S6020, Solvay), and 0.2 wt % of polyvinylidene fluoride (PVdF, S5130, Solvay) were mixed, introduced into an N-methyl-2-pyrrolidone solvent, and then stirred for 30 minutes using a mechanical stirrer to prepare a cathode active material slurry. The slurry was applied onto an aluminum current collector having a thickness of 20 μm to a thickness of about 60 μm using a doctor blade, dried at 100° C. for 0.5 hours using a hot air dryer, further dried in vacuum at 120° C. for 4 hours, and then roll-pressed to prepare a cathode plate.

A lithium secondary battery was manufactured by using a polyethylene separator having a thickness of 14 μm and coated with ceramic on a side of anode and using the electrolyte prepared in Preparation Example 1.

Example 2

A lithium secondary battery was manufactured in substantially the same manner as in Example 1, except that the electrolyte prepared in Preparation Example 2 was used instead of the electrolyte prepared in Preparation Example 1.

Example 3

A lithium secondary battery was manufactured in substantially the same manner as in Example 1, except that the electrolyte prepared in Preparation Example 3 was used instead of the electrolyte prepared in Preparation Example 1.

Example 4

A lithium secondary battery was manufactured in substantially the same manner as in Example 1, except that the electrolyte prepared in Preparation Example 4 was used instead of the electrolyte prepared in Preparation Example 1.

Comparative Example 1

A lithium secondary battery was manufactured in substantially the same manner as in Example 1, except that the electrolyte prepared in Comparative Preparation Example 1 was used instead of the electrolyte prepared in Preparation Example 1.

Comparative Example 2

A lithium secondary battery was manufactured in substantially the same manner as in Example 1, except that the electrolyte prepared in Comparative Preparation Example 2 was used instead of the electrolyte prepared in Preparation Example 1.

Comparative Example 3

A lithium secondary battery was manufactured in substantially the same manner as in Example 1, except that the electrolyte prepared in Comparative Preparation Example 3 was used instead of the electrolyte prepared in Preparation Example 1.

Evaluation Example 2: Evaluation of Cycle Lifetime Characteristics

Figure 3:
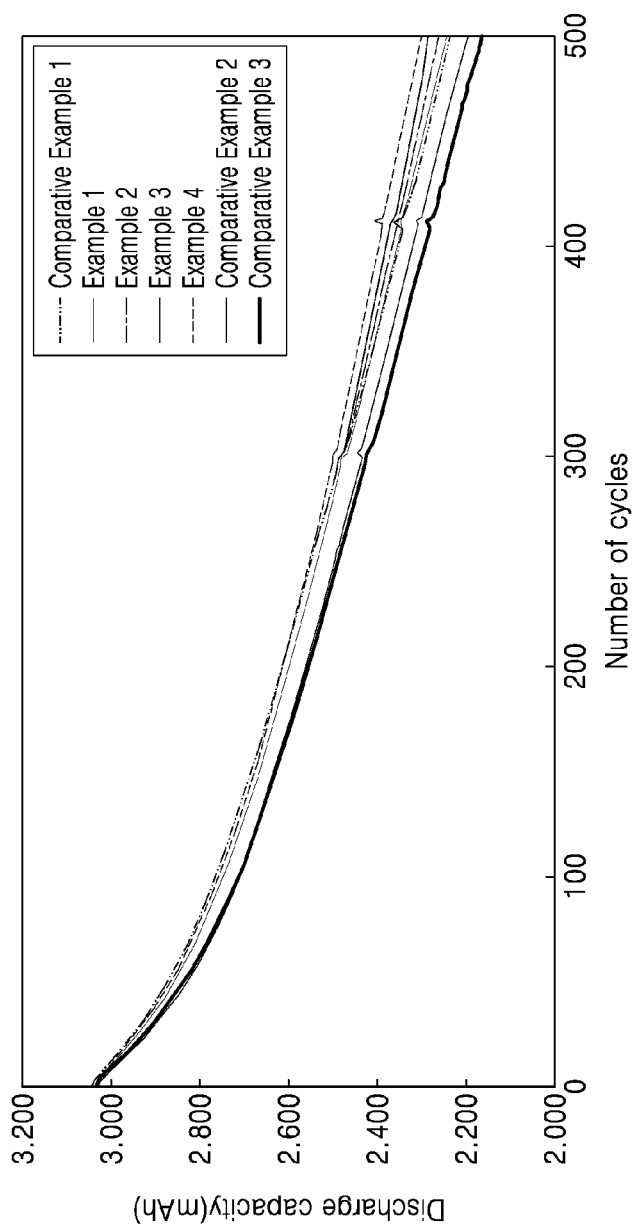
FIG. 3 is a graph illustrating the changes in discharge capacity per cycle at 25° C. of the lithium secondary batteries according to Examples 1 to 4 and Comparative Examples 1 to 3.

Processes of charging the lithium secondary batteries according to Examples 1 to 4 and Comparative Examples 1 to 3 at room temperature under CC-CV 4 A, 4.2V, 100 mA cut-off and then discharging these secondary batteries at 25° C. under CC 10 A, 2.5V cut-off was repeated for 1 cycle to 500 cycles to evaluate cycle lifetime characteristics, and the change in capacity up to 500 cycles is shown in FIG. 3.

Referring to FIG. 3, it may be found that the discharge cycle characteristics of the lithium secondary batteries of Examples 1 to 4 according to the present disclosure is excellent as compared with those of the lithium secondary batteries of Comparative Examples 1 to 3, and that the lithium secondary battery including the compound represented by Formula 1 as an electrolyte additive exhibits excellent lifetime characteristics.

For example, referring to the lithium secondary batteries according to Comparative Examples 2 and 3, it can be seen that, even when each of these lithium secondary batteries includes the compound represented by Formula 1 as an additive, lifetime characteristics is rather deteriorated when an amount (e.g., the weight or content) of the additive is more than 3 wt % on the total weight of the electrolyte.

Evaluation Example 3: Resistance Test in High-Temperature Storage (at 60° C. for 30 Days)

The resistances (DCIR) of the lithium secondary batteries manufactured in Examples 1 to 4 and Comparative Examples 1 to 3 were measured at the first day at which they were stored high temperature (60° C.), and were measured after they were stored for 30 days. Then, resistance increase rates (%) were calculated. The results thereof are shown in Table 1 below and FIG. 4.

TABLE 1

| | Initial DCIR (mΩ) | DCIR (mΩ) after 30 days | DCIR increase rate (%) |
|---|---|---|---|
| Example 1 | 19.32 | 28.37 | 147 |
| Example 2 | 19.34 | 27.66 | 143 |
| Example 3 | 19.09 | 27.14 | 142 |
| Example 4 | 18.84 | 26.32 | 140 |
| Comparative Example 1 | 19.1 | 29.2 | 153 |
| Comparative Example 2 | 19.38 | 29.9 | 154 |
| Comparative Example 3 | 19.23 | 30.68 | 160 |

Figure 4:
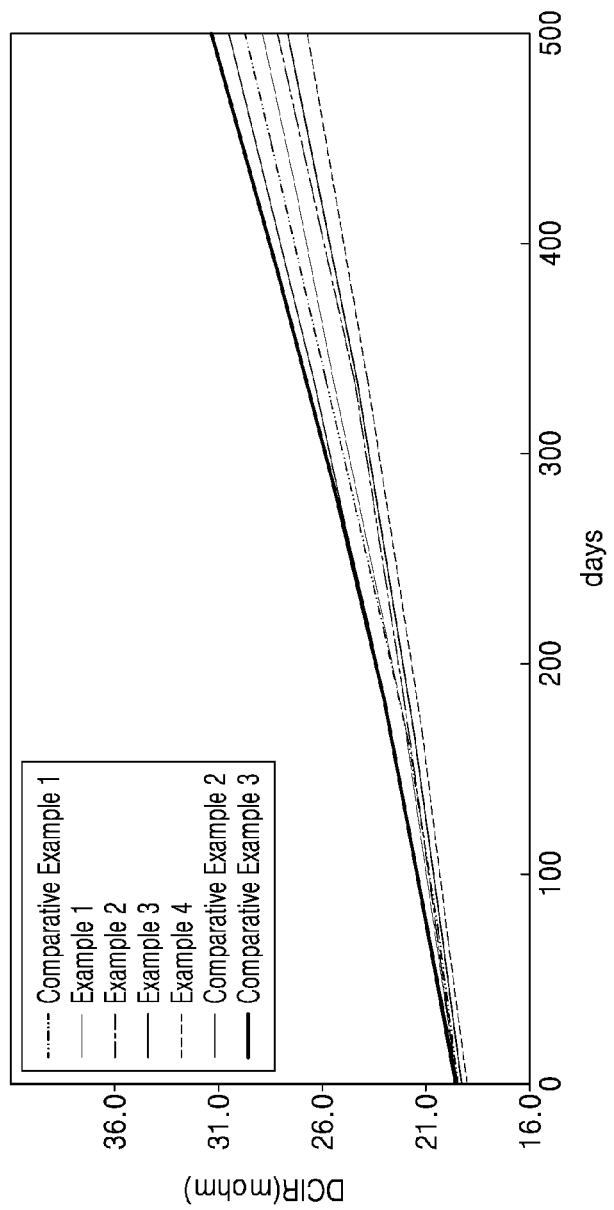
FIG. 4 is a graph illustrating the changes in resistance (DCIR) at 60° C. of the lithium secondary batteries according to Examples 1 to 4 and Comparative Examples 1 to 3.

As shown in Table 1 and FIG. 4, it can be seen that the high-temperature resistance increase rate of each of the lithium secondary batteries of Examples 1 to 4 is lower than that of the lithium secondary battery of Comparative Example 1 not including Compound 1 even when they were stored at high temperature for a long period of time. It is considered that this is because the sulfonamide moiety of Compound 1 effectively suppresses or reduces the side reaction of $LiPF_6$.

Particularly, it can be seen that, although each of the lithium secondary batteries according to Comparative Examples 2 and 3 includes the compound represented by Formula 1 as an additive, resistance characteristics are rather deteriorated when the amount (e.g., weight or content) of the additive is more than 3 wt % based on the total weight of the electrolyte. It is considered that this is because the Compound 1 added in excess acts as a resistor.

Evaluation Example 4: Measurement of High-Temperature Storage Characteristics Each of the lithium secondary batteries manufactured according to Examples 1 to 4 and Comparative Examples 1 to 3 was left at 60° C. for 10 days, 20 days, and 30 days in a state of charge (SOC) of 100%, and the storage characteristics thereof at high temperature (60° C.) were evaluated. The results thereof are given in Table 2 below.

In an initial formation condition, during a first cycle, each of the lithium secondary batteries was CC charged up to 3.6 V by a current of 0.2 C and then discharged up to 2.6 V. During a second cycle, each of the lithium secondary batteries was CC charged up to 4.2 V by a current of 0.2 C and then discharged up to 2.6 V. Thus, an oxide film was formed on the surface of an electrode.

Initial capacities and capacities after 10 days, 20 days, and 30 days were measured after CC-CV charging each of the lithium secondary batteries up to 4.2 V by a current of 1 C and then discharging each of the lithium secondary batteries up to a cut off of 2.6 V by a current of 3 C.

The capacity retention rate (%) is a percentage value of the retention capacity after 10 days, 20 days, and 30 days with respect to initial capacity.

The capacity recovery rate (%) is a percentage value of the recovery capacity after 10, 20, or 30 days with respect to initial capacity.

TABLE 2

|  | After 10 days | | After 20 days | | After 30 days | |
| --- | --- | --- | --- | --- | --- | --- |
|  | Capacity retention rate (%) | Capacity recovery rate (%) | Capacity retention rate (%) | Capacity recovery rate (%) | Capacity retention rate (%) | Capacity recovery rate (%) |
| Example 1 | 91 | 97 | 92 | 95 | 91 | 93 |
| Example 2 | 90 | 96 | 92 | 95 | 90 | 92 |
| Example 3 | 92 | 97 | 93 | 95 | 91 | 93 |
| Example 4 | 92 | 97 | 92 | 95 | 90 | 93 |
| Comparative Example 1 | 91 | 97 | 92 | 94 | 90 | 93 |
| Comparative Example 2 | 91 | 96 | 92 | 94 | 90 | 92 |
| Comparative Example 3 | 91 | 96 | 92 | 95 | 90 | 92 |

Referring to Table 2, it can be seen that the lithium secondary batteries of Examples 1 to 4 are not particularly deteriorated in terms of capacity retention rate and capacity recovery rate as compared with the lithium secondary batteries of Comparative Examples 1 to 3.

According to an embodiment, an electrolyte for a lithium secondary battery, the electrolyte including an additive including a compound including a silicon moiety and a sulfonamide moiety each having a novel structure, may be used, thereby improving the high-temperature stability and lifetime characteristics of the lithium secondary battery.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the appended claims, and equivalents thereof.

What is claimed is:

1. An additive for an electrolyte of a lithium secondary battery, the additive comprising a compound represented by Formula 1:

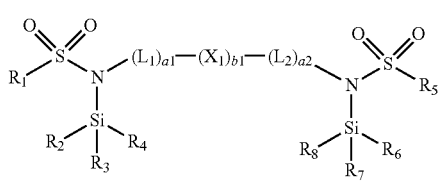

Formula 1 in Formula 1, $X_1$ is $N(R_9)$, O, or S, b1 is selected from an integer of 0 to 3, $L_1$ and $L_2$ are directly connected to each other when b1 is 0, and the $X_1$'s are the same as or different from each other when b1 is 2 or more, $L_1$ and $L_2$ are each independently selected from a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, and a substituted or unsubstituted $C_2$-$C_{30}$ alkoxyalkyl group, and a substituted or unsubstituted $C_1$-$C_{30}$ alkylamine group, a1 and a2 are each independently selected from an integer of 0 to 10, the $L_1$'s are the same as or different from each other when a1 is 2 or more, the $L_2$'s are the same as or different from each other when a2 is 2 or more, and a1+a2 is 1 or more, $R_1$ to $R_9$ are each independently selected from a substituted or unsubstituted $C_1$-$C_{30}$ alkyl group, a substituted or unsubstituted $C_2$-$C_{30}$ alkenyl group, and a substituted or unsubstituted vinyl group, and substituents of the substituted $C_1$-$C_{30}$ alkyl group, the substituted $C_2$-$C_{30}$ alkenyl group, the substituted $C_2$-$C_{30}$ alkynyl group, the substituted $C_2$-$C_{30}$ alkoxyalkyl group, the substituted $C_1$-$C_{30}$ alkylamine group, and the substituted vinyl group are at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a vinyl group, a halogen, a cyano group, a hydroxyl group, and a nitro group.

2. The additive of claim 1, wherein, in Formula 1, $L_1$ and $L_2$ are each independently selected from:

a methylene group, an ethylene group, a propylene group, a butylene group, a pentylene group, a hexylene group, and a heptylene group; and a methylene group, an ethylene group, a propylene group, a butylene group, a pentylene group, a hexylene group, and a heptylene group, each of which is substituted with at least one selected from a methyl group, an ethyl group, a propyl group, a vinyl group, —F, —Cl, —Br, —I, a cyano group, a hydroxyl group, and a nitro group.

3. The additive of claim 1, wherein, in Formula 1, a1+a2 is 1 or 2.

4. The additive of claim 1, wherein, in Formula 1, i) b1 is 0, each of a1 and a2 is 1, and each of $L_1$ and $L_2$ is a methylene group, ii) b1 is 0, a1 is 1, a2 is 0, and $L_1$ is an ethylene group, iii) b1 is 0, a1 is 2, a2 is 0, and $L_1$ is a methylene group, iv) b1 is 0, a1 is 0, a2 is 1, and $L_2$ is an ethylene group, or v) b1 is 0, a1 is 0, a2 is 2, and $L_2$ is a methylene group.

5. The additive of claim 1, wherein, in Formula 1, $R_1$ to $R_9$ are each independently selected from:

a $C_1$-$C_{30}$ alkyl group, a vinyl group, an a $C_1$-$C_{30}$ alkyl group substituted with at least one selected from a methyl group, an ethyl group, a propyl group, a butyl group, —F, —Cl, —Br, —I, a cyano group, a hydroxy group, and a nitro group.

6. The additive of claim 1, wherein, in Formula 1, each of $R_1$ to $R_9$ is a $C_1$-$C_{30}$ alkyl group.

7. The additive of claim 1, wherein, the compound represented by Formula 1 is Compound 1:

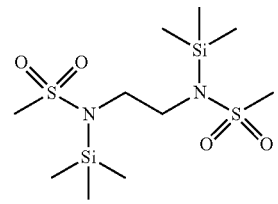

Compound 1

8. An electrolyte for a lithium secondary battery, comprising:

a lithium salt;

a non-aqueous organic solvent; and the additive according to claim 1.

9. The electrolyte of claim 8, wherein, an amount of the additive is in a range of about 0.1 wt % to about 3 wt % based on a total weight of the electrolyte.

10. The electrolyte of claim 8, wherein, an amount of the additive is in a range of about 0.1 wt % to about 2 wt % based on a total weight of the electrolyte.

11. The electrolyte of claim 8, wherein, the lithium salt comprises at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (0≤x≤20, 0≤y≤20), LiCl, LiI, lithium bis(oxalate) borate (LiBOB), and $LiPO_2F_2$.

12. The electrolyte of claim 8, wherein, the non-aqueous organic solvent comprises at least one selected from ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethyl formamide, dimethylacetamide, gamma-valerolactone, gamma-butyrolactone, and tetrahydrofuran.

13. A lithium secondary battery, comprising:
a cathode;
an anode; and
the electrolyte of claim 8.

14. The lithium secondary battery of claim 13, wherein, the cathode comprises a cathode active material having a layered structure.

15. The lithium secondary battery of claim 14, wherein, the cathode active material is represented by Formula 3:

$$LiNi_{1-s}M'_sO_2 \qquad \text{Formula 3}$$

wherein, in Formula 3,
M' is at least one selected from Co, Mn, Al, Cu, Fe, Mg, Cr, Zn, B, and Ga, and
0<s≤0.99 is satisfied.

16. The lithium secondary battery of claim 14, wherein, the cathode active material is represented by Formula 4:

$$Li_t(Ni_{1-u-v}Co_uM''_v)O_2 \qquad \text{Formula 4}$$

wherein, in Formula 4,
M" is Mn or Al, and 0.96≤t≤1.05, 0<u≤0.5, and 0<v≤0.5 are satisfied.

* * * * *